Sept. 4, 1923.  
J. SCHMIDT  
RESILIENT WHEEL  
Filed March 17, 1922
1,467,199
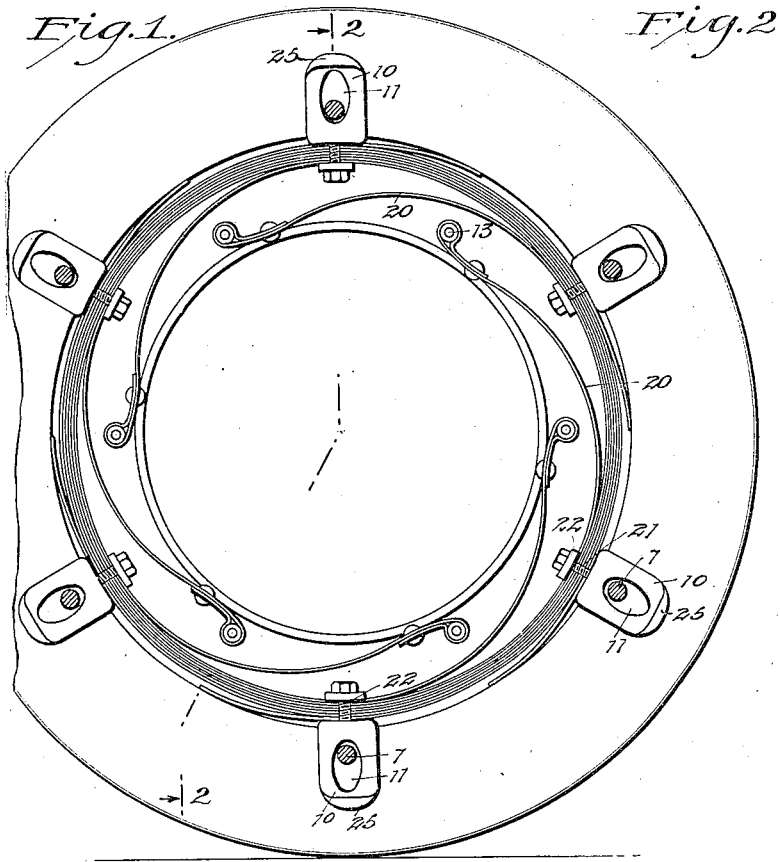
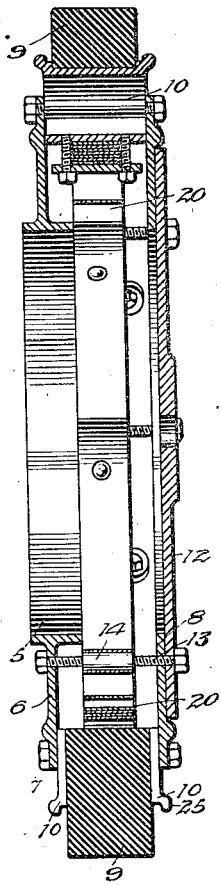
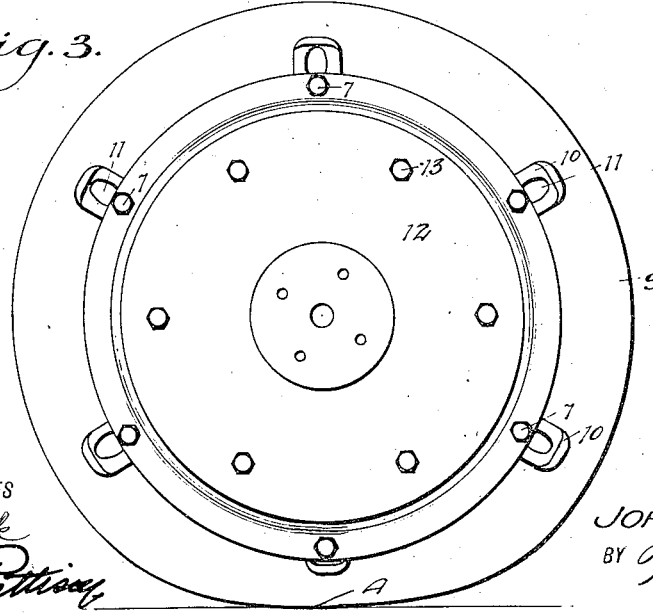
WITNESSES
INVENTOR  
JOHN SCHMIDT  
BY  
ATTORNEYS Patented Sept. 4, 1923.

1,467,199

UNITED STATES PATENT OFFICE.

JOHN SCHMIDT, OF NEW YORK, N. Y.

RESILIENT WHEEL.

Application filed March 17, 1922. Serial No. 544,620.

*To all whom it may concern:*

Be it known that I, JOHN SCHMIDT, a citizen of the United States, and a resident of the city of New York, borough of Manhattan, in the county and State of New York, have invented a new and Improved Resilient Wheel, of which the following is a full, clear, and exact description.

The present invention relates to new and useful improvements in wheels, and it pertains more particularly to wheels of the resilient type.

It is one of the primary objects of the invention to provide a wheel of the resilient type in which the resiliency of the wheel is provided by a plurality of springs.

It is a further object of the invention to provide a wheel in which a cushion tire may be employed with the result that resiliency equivalent to that obtained in a pneumatic tire is attained.

It is a still further object of the invention to provide a new and improved form of resilient wheel which may be readily disassembled for the purpose of renewal, repair, and the like.

With the above and other objects in view, reference is had to the accompanying drawings, in which Figure 1 is a sectional view of a wheel constructed in accordance with the present invention;

Fig. 2 is a sectional view of the wheel, taken on the line 2—2 of Fig. 1;

Fig. 3 is a front or outside view of the wheel showing the manner in which the wheel operates.

Referring more particularly to the drawings, the wheel comprises a hub member 5 and said hub member is provided with an annular flange 6. Secured to the annular flange 6 by means of bolts 7 or the like, is a plate 8, the plate 8 being spaced with relation to the flange 6. Slidably mounted between the flange 6 and the plate 8, is a tire 9 carried between metallic members 10 in the form of comparatively small blocks. Each of these metallic members 10 is provided with an oval slot 11 in which its respective bolt 7 slides.

The reference character 12 designates a closing plate and said plate is held in position by means of bolts 13 which extend through the plate 8 and the flange 6 of the hub member 5. Each of these bolts 13 is provided with a centrally disposed portion 14, which is circular in cross-sectional form, said bolts forming the means for securing the springs from which the resiliency of the wheel is obtained. These bolts 13 are secured in equidistantly spaced relation about the wheel as shown.

The reference character 20 designates the springs from which the resiliency is obtained, and as shown in Fig. 1, one of the springs is connected to each of the circular members 14 of the bolts 13 heretofore mentioned. The outer end of each of the springs extends to a point in advance of that at which the inner end of the spring is connected to its respective bolt 13.

By extending the springs entirely around the wheel so that the free end of each spring passes beyond the point of securement of the secured end, it will be seen that where each spring engages the body of springs at the first clip, said spring is innermost of the body of springs. However, as the springs successively engage the body the springs are so positioned that the free end of each spring lies outside of the body portion owing to the fact that each spring extends entirely around the wheel.

It will be noted that each of the metallic members is screw-threaded to receive bolts 21 or the like, and said bolts secure clamping plates 22 in position in order that the proper position of the several resilient members 20 may be maintained. These plates, however, are not clamped about the resilient members 20 with sufficient force to prevent sliding movement of said resilient members under compression and expansion thereof.

The device functions in the following manner:

As the wheel is revolved and the resilient members 20 compressed, the bolts 7 heretofore mentioned slide longitudinally of the oval slots 11 in the metallic members 10. Owing to the oval shape of the slots 11, sufficient play of the bolts 7 laterally of said slots is provided for.

As more clearly shown in Fig. 2, each of these metallic members 10 is provided with a shoulder 25, and as the resilient members 20 are compressed the shoulders 25 are adapted to engage the outer peripheral edges of the flange 6 and the plate 8. When the several parts have attained these positions, the weight then is transferred from the resilient members to the cushion tire 9, and said cushion tire 9 is placed under compression as indicated by the reference character A in Fig. 3.

From the foregoing it is apparent that the present invention provides a new and improved form of resilient wheel in which the resiliency is furnished by a plurality of resilient spring members up to a predetermined degree, after which the load of the wheel is carried by a cushion tire capable of being placed under compression as described.

The form of the invention shown in the drawings is a preferred form, although it is understood that modifications in the construction and arrangement of the parts may be adopted without departing from the spirit of the invention.

What is claimed is:

1. A spring wheel comprising a pair of spaced parallel members, a plurality of spring elements secured between said members, each of said springs extending entirely around the wheel and having a free end terminating at a point in advance of the point of securement of the spring, clips for securing said springs together, and a resilient tire supported by said clips.

2. A resilient wheel comprising a pair of spaced members and spring elements secured to said spaced members, said spring elements being connected to the spaced members at their inner ends and having their body portions extending entirely around the wheel with the free end of each of said spring elements extending to a point in advance of the point of securement of said spring element.

JOHN SCHMIDT.